Patented July 8, 1930

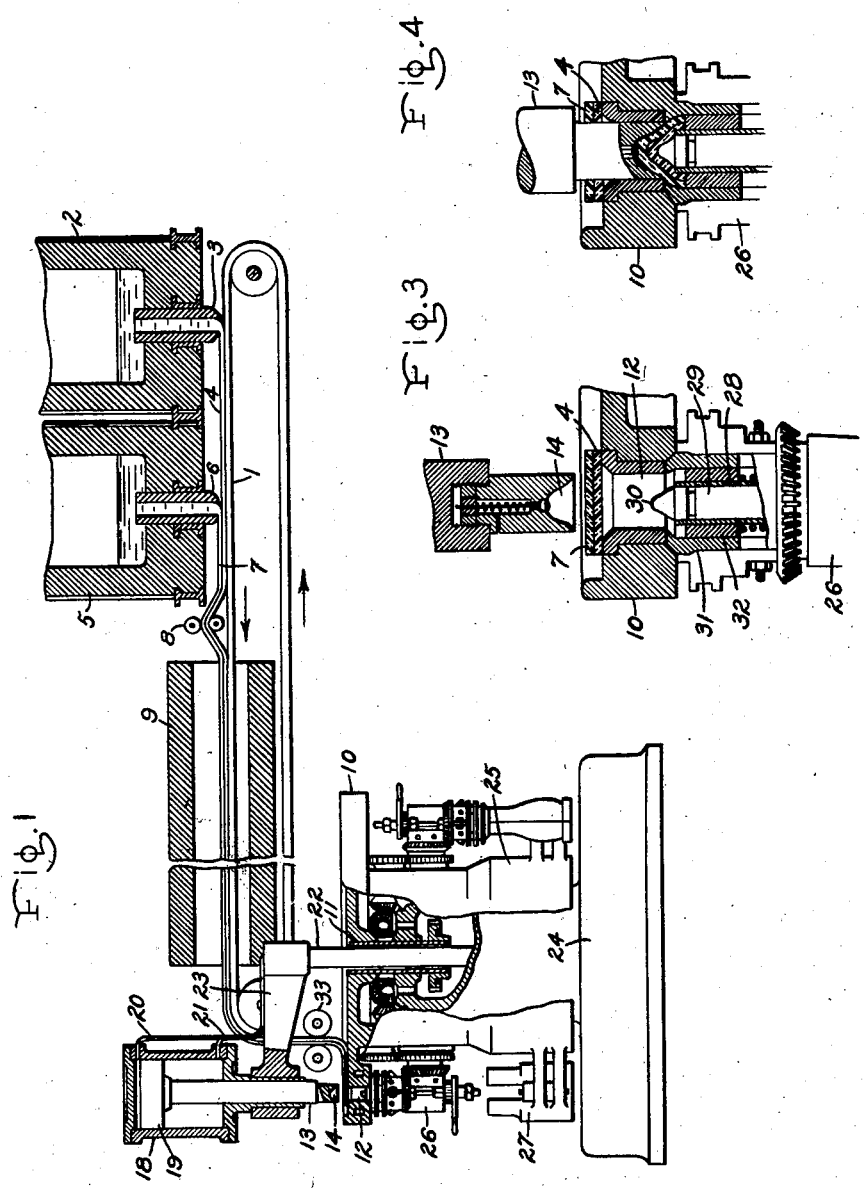

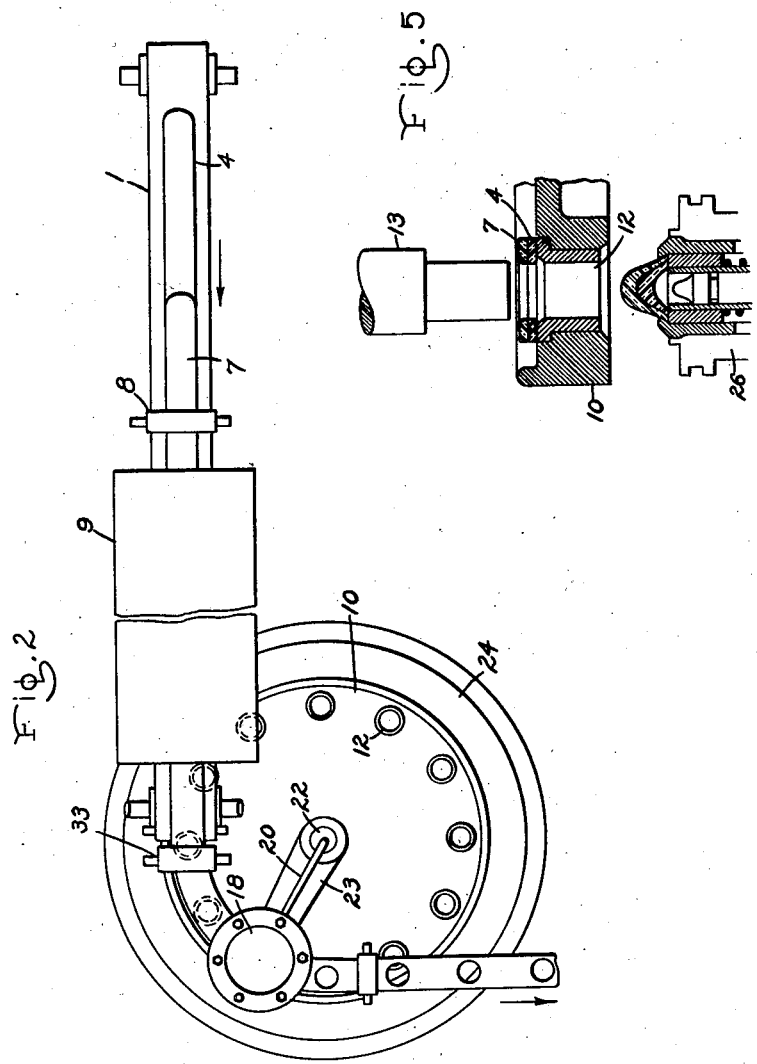

1,770,335

UNITED STATES PATENT OFFICE

KITSUZO FUWA, OF TOKYO, JAPAN, ASSIGNOR TO GENERAL ELECTRIC COMPANY, A CORPORATION OF NEW YORK

METHOD AND APPARATUS FOR MAKING BLOWN-GLASS ARTICLES

Application filed June 8, 1929, Serial No. 369,298, and in Japan July 31, 1928.

My invention relates to methods of and apparatus for making blown articles of glass and more particularly to methods of and apparatus for making so-called veneer glass articles which comprise two or more layers of clear or colored glass. Heretofore such articles have been produced mostly by hand work. The object of my invention is to provide a method and apparatus by which a very uniform product may be obtained and which permit of automatic operation.

According to my invention, the article is produced from a blank obtained by punching from a ribbon of plastic glass consisting of two or more layers of different glasses. The punched-out blank is then delivered to a blowing device and blown into the desired article in the ordinary manner. The ribbon of plastic glass from which the blank is punched is formed by delivery from receptacles each containing a different glass from each of which a stream of molten glass is caused to flow, preferably upon an endless belt conveyor, which carries the ribbon composed of the layers of glass to the punching apparatus. Preferably the composite ribbon is passed through a re-heating furnace before delivery to the punching machine. Various other features and advantages of my invention will appear from the description which follows of a species thereof and from the accompanying drawing.

In the drawing Fig. 1 is an elevation partially in section of an apparatus by means of which my invention may be practiced; Fig. 2 is a plan view; Fig. 3 is a fragmentary vertical section of a portion of the punching apparatus; Fig. 4 is a similar view showing the apparatus at another stage in its operation; and Fig. 5 is a similar view showing the apparatus at the stage of completion of the punched-out blank and withdrawal of the punch.

In the drawing, my invention is shown as applied to the production of incandescent lamp bulbs comprising two layers of glass. The conveyor 1 consists of an endless belt which passes over suitable rollers in the direction shown by the arrows. A glass furnace 2 has an outlet 3 through which molten glass discharges upon the conveyor 1 to form a layer 4. The furnace 5 has an outlet 6 which discharges molten glass, for instance, of a different color, upon the layer 4 to form a superposed layer 7. The stratified body of glass thus formed passes between a pair of rollers 8 which compresses the two glasses together and determines the thickness of the ribbon. A re-heating furnace 9 may be provided to produce a uniform temperature of the ribbon and this may be heated in any well known manner. The stratified ribbon then passes through to the punching device. As shown, this is of the same general type as that disclosed in Patent 1,235,008, issued July 31, 1917, to Canfield. It comprises a table 10 supported upon and rotated through a shaft 11 and carrying a plurality of dies 12. The punch 13 is mounted to be reciprocated so as to cooperate with the die 12 in forming blanks from the stratified ribbon of glass. The lower end is formed with a bell-shaped depression 14. A means is provided for reciprocating the punch 13 consisting of a cylinder 18 which operates the piston 19 connected to the said punch. Suitable air supply and exhaust conduits 20—21 are provided and this portion of the apparatus is supported from the central standard 22 through an arm 23. The specific type of machine shown comprises the base 24 upon which is rotatably mounted the standard 25 which carries the table 10 and also the blowing device 26 and mold 27. This specific apparatus is not of my invention and a detailed description thereof will be omitted as such machines are well known. As shown in Figs. 3, 4 and 5, the cylindrical casing 28 has reciprocating therein a plunger 29 having a bell-shaped head 30. As shown in Fig. 4, this is reciprocated to force the blank against the correspondingly shaped depression 14 in the punch. The collar 31 is shaped to form a rim which engages the circumference of the blank which rests against the ring 32.

The stratified glass ribbon passes through a pair of rollers 33, the pressure of which increases the adherence of the layers and regulates the thickness of the ribbon. After the blank has been punched, as shown in Fig.

5, the punch is raised and the blowing mechanism lowered carrying with it the punched-out blank. The blowing mechanism is then rotated into the position shown to the right at Fig. 1 and the blank is blown in the mold 27. As shown in Fig. 2, there is an excess of glass comprising a ribbon with a series of apertures punched therein and this may be re-melted.

While I have described a specific apparatus for carrying out my invention, it will be obvious that various modifications may be made without departing from the scope of my invention.

What I claim as new and desire to secure by Letters Patent of the United States, is:

1. The method of manufacturing veneer glass articles which consists in flowing streams of glass from a plurality of containers to form a ribbon comprising a plurality of layers of plastic glass and then punching blanks from said ribbon and blowing the said blanks into the desired articles.

2. The method of manufacturing veneer glass articles which consists in flowing streams of glass from a plurality of containers upon a continuously moving conveyor to form a ribbon comprising a plurality of layers of plastic glass and then continuously punching blanks from said ribbon and blowing said blanks into the desired articles.

3. The method of manufacturing veneer glass bulbs for incandescent electric lamps and similar articles which consists in flowing streams of glass from a plurality of containers upon a continuously moving conveyor to form a ribbon comprising a plurality of layers of plastic glass and then continuously punching blanks from said ribbon and blowing said blanks into bulbs.

4. An apparatus for manufacturing veneer glass articles comprising a plurality of containers for molten glass having discharge outlets, a conveyor disposed adjacent to said outlets and adapted to receive the discharge from said outlets, a punch disposed adjacent to the discharge end of said conveyor and means for moving said conveyor and punch in desired time relation to each other to cause the latter to form blanks from the glass ribbon carried by the said conveyor.

5. An apparatus for manufacturing veneer glass articles comprising a plurality of containers for molten glass having discharge outlets, a conveyor disposed adjacent to said outlets and adapted to receive the discharge from said outlets, a punch disposed adjacent to the discharge end of said conveyor, means for moving said conveyor and punch in desired time relation to each other to cause the latter to form blanks from the glass ribbon carried by the said conveyor, a mold and blowing means comprising a spindle adapted to receive a blank from said punch and means for moving said spindle to cause a transfer of said blank to said mold to blow an article therefrom.

In witness whereof I have hereunto set my hand this 15th day of May, 1929.

KITSUZO FUWA.